US009625049B2

(12) United States Patent  
Starzmann

(10) Patent No.: US 9,625,049 B2  
(45) Date of Patent: Apr. 18, 2017

(54) VALVE ASSEMBLY

(71) Applicant: FESTO AG & Co. KG, Esslingen (DE)

(72) Inventor: Ralf Starzmann, Reichenbach (DE)

(73) Assignee: FESTO AG & CO. KG, Esslingen (DE)

( * ) Notice: Subject to any disclaimer, the term of this patent is extended or adjusted under 35 U.S.C. 154(b) by 73 days.

(21) Appl. No.: 14/636,656

(22) Filed: Mar. 3, 2015

(65) Prior Publication Data

US 2015/0267834 A1 Sep. 24, 2015

(30) Foreign Application Priority Data

Mar. 24, 2014 (DE) .................. 10 2014 004 213

(51) Int. Cl.
*F16K 31/02* (2006.01)
*F15B 13/044* (2006.01)
*F16K 27/00* (2006.01)
*F15B 13/08* (2006.01)

(52) U.S. Cl.
CPC .......... *F16K 31/02* (2013.01); *F15B 13/0825* (2013.01); *F15B 13/0857* (2013.01); *F15B 13/0889* (2013.01); *F15B 13/0814* (2013.01); *F15B 13/0839* (2013.01)

(58) Field of Classification Search
CPC ............. F15B 13/0814; F15B 13/0825; F15B 13/0839; F15B 13/0857; F15B 13/0889; F15B 13/0846; F15B 13/0867; F15B 13/0817; F16K 27/003; F16K 27/029; F16K 31/0675; H01F 2007/062

USPC ...................................................... 251/129.01
See application file for complete search history.

(56) References Cited

U.S. PATENT DOCUMENTS

| 3,450,160 A | * | 6/1969 | Tess ..................... F15B 13/0431 |
| | | | 137/625.64 |
| 5,295,511 A | * | 3/1994 | Schleinhege ....... F15B 13/0817 |
| | | | 137/554 |
| 5,348,047 A | * | 9/1994 | Stoll ..................... F15B 13/0814 |
| | | | 137/554 |

FOREIGN PATENT DOCUMENTS

| DE | 4222637 | | 1/1994 | |
| DE | 19704152 | | 8/1998 | |
| DE | 19730972 | | 10/1998 | |
| DE | WO 02057124 | * | 7/2002 | ............. B60T 8/368 |

* cited by examiner

*Primary Examiner* — Marina Tietjen  
*Assistant Examiner* — Seth W Mackay-Smith  
(74) *Attorney, Agent, or Firm* — Hoffmann & Baron, LLP

(57) ABSTRACT

A valve assembly includes a valve unit, which is mounted on a valve support and composed of a valve and a connecting bridge fitted to the valve. The connecting bridge is used for electrically contacting the valve to signal transmission means located in the valve support. It has an L-shape with a first L-leg overlapping the valve and a second L-leg projecting downwards laterally adjacent to the valve. For its location on the valve support, the valve is provided on its underside with a mounting base with a laterally protruding base projection, with which the connecting bridge engages with its second L-leg for stabilisation.

23 Claims, 3 Drawing Sheets

VALVE ASSEMBLY

BACKGROUND OF THE INVENTION

The invention relates to a valve assembly comprising a valve support and at least one valve unit fitted in its position of use with its underside leading to a mounting surface of the valve support, wherein the valve unit comprises an electrically actuated valve with externally accessible first electric connecting means, and wherein electric signal transmission means with second electric connecting means accessible from the mounting surface are located in or on the valve support, wherein the valve unit further comprises an L-shaped connecting bridge mounted on the valve for the mutual electric connection of the first and second electric connecting means, the connecting bridge overlapping with a first L-leg the top side of the valve opposite its underside and projecting downwards with a second L-leg extending in a vertical direction of the valve laterally past a drive section of the valve containing electrically actuated drive means, wherein first electric mating connecting means located on the connecting bridge are contacted to the first electric connecting means of the valve and wherein second electric mating connecting means, which are located on the second L-leg and which are electrically connected to the first electric mating connecting means via electric connecting conductors of the connecting bridge, are electrically contacted to the second electric connecting means assigned to the valve support in the position of use of the valve unit.

A valve assembly of this type, which is known from DE 42 22 637 C2, comprises a valve support which is designed for mounting several valve units and in which electric signal transmission means are located which are used to provide electrically actuated valves of the valve units mounted on a mounting surface of the valve support with the electric actuating signals required for their actuation. On the top side, the valves of the valve units have first electric connecting means, which are connected to second electric connecting means of the electric signal transmission means by means of a connecting bridge. The connecting bridge has an L-shape, overlapping with a first L-leg the associated valve on the top side and projecting downwards with a second L-leg in the vertical direction of the valve, establishing the electric connection to the signal transmission means in the region of the valve support. When mounting a valve unit on a valve support, the valve is usually mounted first, followed by the fitting of the connecting bridge. If the connecting bridge is fitted to the valve in advance, the connecting bridge can, if handled improperly, be twisted relative to the valve by acting on the downward-projecting second L-leg, which can result in damage to the mutually engaged first electric connecting means of the valve and first electric mating connecting means of the connecting bridge. This makes a subsequent removal and replacement of the connecting bridge difficult.

DE 19704152 A1 discloses a control unit suitable for mounting on a valve block, which has an L-shaped profiled housing which can be mounted on the valve block in such a way that it overlaps its top side with a first L-leg and projects downwards laterally past the valve block with a second L-leg. A valve control unit of a similar structure is also disclosed in DE 19730972 C1.

SUMMARY OF THE INVENTION

The invention is based on the problem of taking measures which in particular reduce the risk of damage involved in handling the valve unit.

To solve this problem, it is provided, in combination with the features described above, that the valve comprises in the region of the underside of the valve unit a mounting base, which is used for the mechanical fixation of the valve on the valve support and which has a base projection which laterally projects relative to the drive section located above and which is penetrated by the second L-leg of the connecting bridge.

With the aid of the mounting base of the valve, the valve and the connecting bridge combined with the valve to form the valve unit can be located on the valve support in a stable manner. As a result of the fact that the mounting base has a laterally protruding base projection into which the connecting bridge mounted in the valve dips with its downward-projecting second L-leg, the connecting bridge receives a transverse stabilisation even before the valve unit is mounted on the valve support, so that the risk of swiveling caused by improper handling and the resulting risk of bending the interacting electric connecting means and mating connecting means of the valve and the connecting bridge are reduced considerably. The base projection fulfills a stabilising function for stabilising the position of the connecting bridge fitted to the valve even before the valve unit is mounted on the valve support. In addition, the layout of the mounting base can, in terms of the desired stability, be designed without taking account of the connecting bridge, because the second L-leg passes through the base projection, with the result that the mounting base can extend around the second L-leg with any preferred external contour.

When the valve is combined with the connecting bridge to form a valve unit, this valve unit can be mounted on the valve support, the drive means of the valve being electrically contacted to electric signal transmission means located in or on the valve support by means of the connecting bridge. There is, however, also the preferred possibility of operating the valve without any connecting bridge and of supplying the required electric actuating signals by electric signal transmission means which do not extend in or on the valve support, in particular by one or more cables which can be releasably connected directly to the first electric connecting means of the valve by means of suitable cable connectors. The mounting base can be used for the stable location of the valve on the valve support, whichever type of electric connection is chosen.

Advantageous further developments of the invention can be derived from the dependent claims.

Expediently, the first electric connecting means are located on the top side of the valve and the first electric mating connecting means are located on the first L-leg of the connecting bridge, which overlaps this top side. This facilitates a particularly simple mounting of the connecting bridge on the valve and ensures optimum access to the first electric connecting means.

Alternatively, the first electric connecting means can be located on a lateral outer surface of the valve, in particular on the lateral outer surface to which the second L-leg of the connecting bridge is assigned. In this case, the first electric mating connecting means are then preferably located on the second L-leg of the connecting bridge. In this case, the first L-leg is, for example, used to locate the connecting bridge on the valve. The first L-leg may further comprise electrically actuated indicating means for the visual indication of at least one operating state of the valve, for example at least one LED. This, however, depends on the position where the first electric mating connecting means are placed.

The L-shaped connecting bridge is preferably mounted on the valve. In this way, the connecting bridge can be removed from the valve if required, in order to operate the latter without the connecting bridge and to feed the electric signals required for its operation directly to the first electric connecting means via cable connections. The second L-leg of the connecting bridge is removed from, in particular pulled out of, the base projection when the connecting bridge is removed from the valve.

A through-hole which is oriented in the longitudinal direction of the second L-leg and therefore extends in the vertical direction of the valve and which is entirely enclosed peripherally and through which the second L-leg of the connecting bridge mounted on the valve passes expediently passes through the base projection. Connected to this is in particular a stable structure of the base projection, compared to another possible embodiment in which the through-hole is open in a circumferential region owing to a, for example, slotted design of the base projection.

If the second L-leg has, at the outer circumference of the section extending within the through-hole, an annular seal in sealing contact with the inner circumferential surface of the through-hole, the ingress of moisture through the through-hole and into the region of the mutually contacted second electric connecting means and second electric mating connecting means can be advantageously prevented.

On the basis of the same background, it is advantageous if the mounting base has at its base surface facing the mounting surface a seal which frames the through-hole through which the connecting bridge passes and which prevents the ingress of moisture which might reach the internal electric contact means in the joint region between the valve support and the mounting base.

Adjoining the region through which the second L-leg passes, the base projection expediently has a freely terminating outer end section which can be identified as mounting end section, because it is provided with at least one fastening means for releasably fastening the mounting base to the valve support. The access to this at least one fastening means is therefore not affected by the connecting bridge. It is further advantageous that the connecting bridge can be mounted very close to and in particular in immediate contact with the side surface of the valve without affecting the usability of the fastening means.

At least one fastening means of the mounting end section is expediently designed as a mounting hole which passes through the base projection in the vertical direction and in particular facilitates the insertion of a mounting screw. A mounting screw for locating the valve on the valve support is expediently inserted into the mounting hole from the top and tightened into a threaded hole of the valve support, which is in alignment with the mounting hole, the mounting screw being supported with a screw head on a top side of the base projection, so that the mounting base can be clamped to the valve support in the vertical direction of the valve.

In an end section opposite the base projection in a direction perpendicular to the vertical direction of the valve, the mounting base expediently comprises at least one further fastening means, which likewise contributes to the mechanical connection between the mounting base and the valve support. This further fastening means may likewise be a mounting hole, which is used in a similar way as that described above in order to allow a mounting screw to pass through. Particularly advantageous, however, is a design of the further fastening means as a mounting hook which engages with an anchoring groove with an undercut cross-section of the valve support and which establishes a positive connection to the valve support in the vertical direction of the valve. With such a design, the valve support to be mounted can in the assembly process initially be inserted with the mounting hook into the anchoring groove in an inclined orientation, whereupon the valve support can be pivoted to its plane position at the mounting surface in a pivoting operation.

Viewed in the height or vertical direction of the valve, the mounting base expediently has an oblong and expediently rectangular outline. The base projection is in particular assigned to one of the two narrow end sections of the mounting base.

The connecting bridge is expediently located positively on the valve by means of a latch connection device. The latch connection becomes effective when the connecting bridge is attached to, in particular pinned to, the valve. The latch connection device is preferably designed for releasable latching. For easy unlocking, the latch connection device can be operated manually, comprising for this purpose in particular a pivotably mounted snap hook as a latch connection means.

The first electric connecting means located on the valve, which are connected to the internal electric drive means of the valve, expediently belong to a plug-in connection device. In combination with this, the first electric mating connecting means on the first L-leg of the connecting bridge are part of a mating plug-in connection device of the connecting bridge, which is capable of establishing an electromechanical plug-in connection with the plug-in connection device when the connecting bridge is mounted on the valve.

On the side of the base projection, the drive section of the valve expediently has an outer contour which is stepped in the vertical direction of the valve, so that the valve has a stair-like stepped contour on the side of the base projection. On its inner long side facing the valve, the second L-leg is expediently stepped as well, so that is can laterally contact the valve along the entire height of the latter and be supported in this respect.

Below the region of the base projection through which the second L-leg of the connecting bridge passes, the valve support expediently has a wall opening which terminates into an internal signal transmission chamber of the valve support. The connecting bridge passes through the base projection and dips into the wall opening with a contacting end section, thereby establishing by means of its second electric mating connecting means located there a releasable electric connection to the second electric connecting means of the electric signal transmission means. In this context, it is advantageous if the second electric mating connecting means are designed as spring contact means which are contacted to the second electric connecting means in a purely non-positive manner.

The at least one valve is in particular constructed in such a way that the drive section and the mounting base are separate components, being in particular bolted to one another.

The electrically actuated valve of the at least one valve unit comprises at least one movable valve member and electrically actuated drive means which are assigned to this valve member and which are capable of causing a switch-over movement of the valve member and of ensuring that the valve member can be positioned in different switching positions. Depending on the switching position of the valve member, passages of the valve are fluidically connected to or disconnected from one another in a predetermined arrangement depending on the valve type. The vale is a 2/2-way valve in particular, but it can obviously have another valve functionality, for example that of a 3/2-way valve. The valve is preferably a solenoid valve, but other drive principles are also feasible, for example that of a piezoelectric valve. The electrically actuated valve may further be either a directly actuated valve or a valve with an electro-fluidic or electro-pneumatic pilot valve.

One or more valve support passages which communicate with a valve passage each of the at least one valve in the region of the mounting surface extend(s) expediently extend in the valve support.

The mounting surface of the valve support is preferably divided into a plurality of mounting locations which are arranged in a row in a line-up direction and each of which can be or is detachably fitted with a valve unit. This being so, the assembly can be identified as a bank-type valve assembly. In such an embodiment, it is advantageous if a header feed passage which jointly communicates with all valve units on the mounting surfaces extends in the valve support, in order to supply the valve units with a pressure fluid, in particular compressed air, which can be controlled. Depending on the embodiment of the valve assembly, at least one header relief passage can also be provided in the valve support; this may in particular be a header vent passage used to carry away pressure fluid returning from the connected loads.

Each valve is expediently equipped with a valve operating passage which can be connected to a load to be operated, for example to a fluid-operated drive. The valve operating passage expediently terminates at a base surface of the mounting base facing the mounting surface, so that it communicates with a valve support operating passage extending through the valve support in the position of use of the valve unit. It is, however, also possible to configure the valve operating passage in such a way that it terminates on an outside of the valve away from the base surface of the mounting base, so that a fluid line to a load can be connected independently of the valve support.

BRIEF DESCRIPTION OF THE DRAWINGS

The invention is explained in greater detail below with reference to the accompanying drawing, of which.

DETAILED DESCRIPTION

Figure 1:
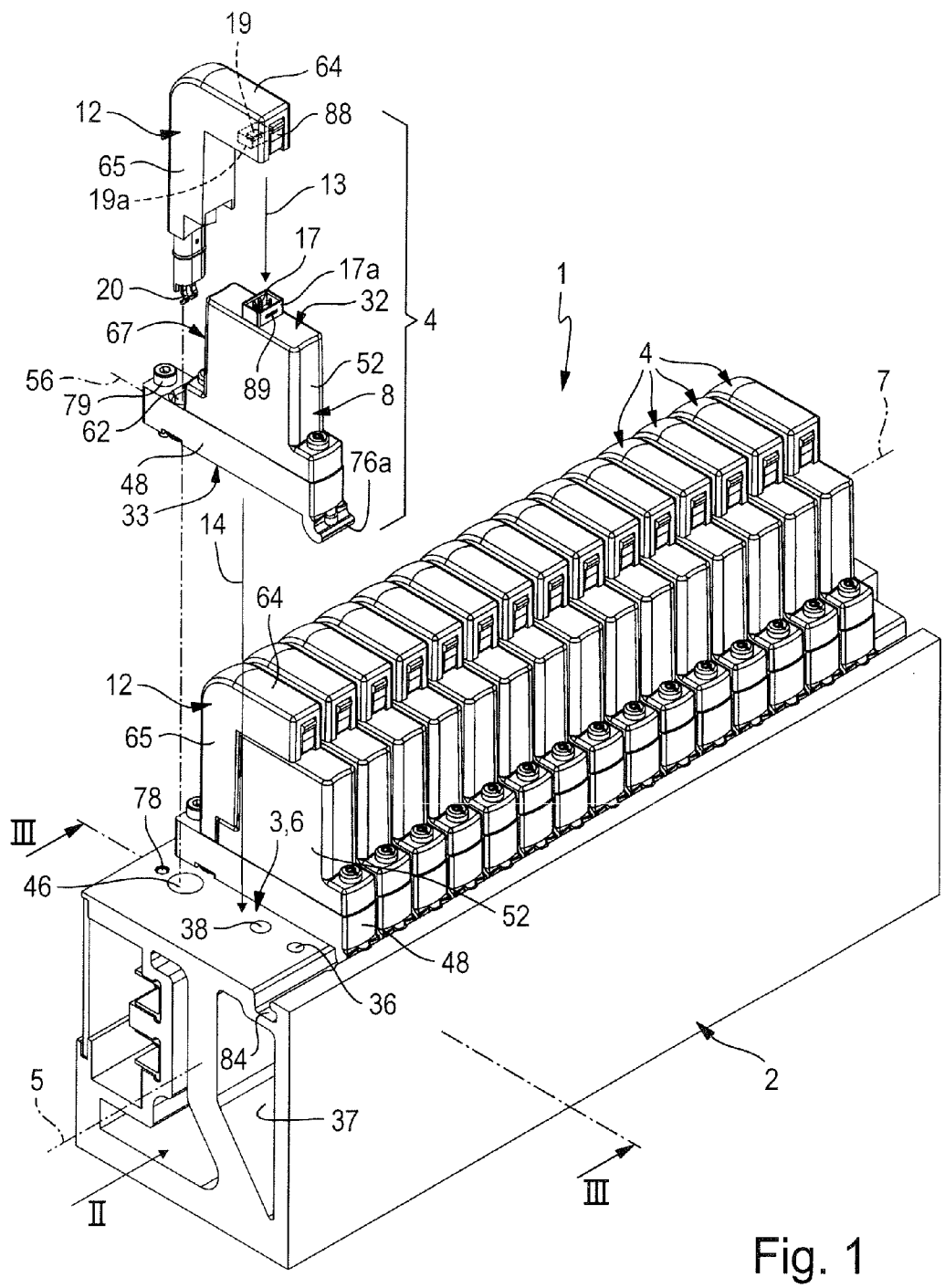
FIG. 1 is an isometric representation of a preferred embodiment of the valve assembly according to the invention, wherein the valve support is shown in a state fitted with a plurality of valve units and wherein a valve unit is shown removed from the valve support, in a state in which the connecting bridge has not yet been mounted on the associated valve.
Figure 2:
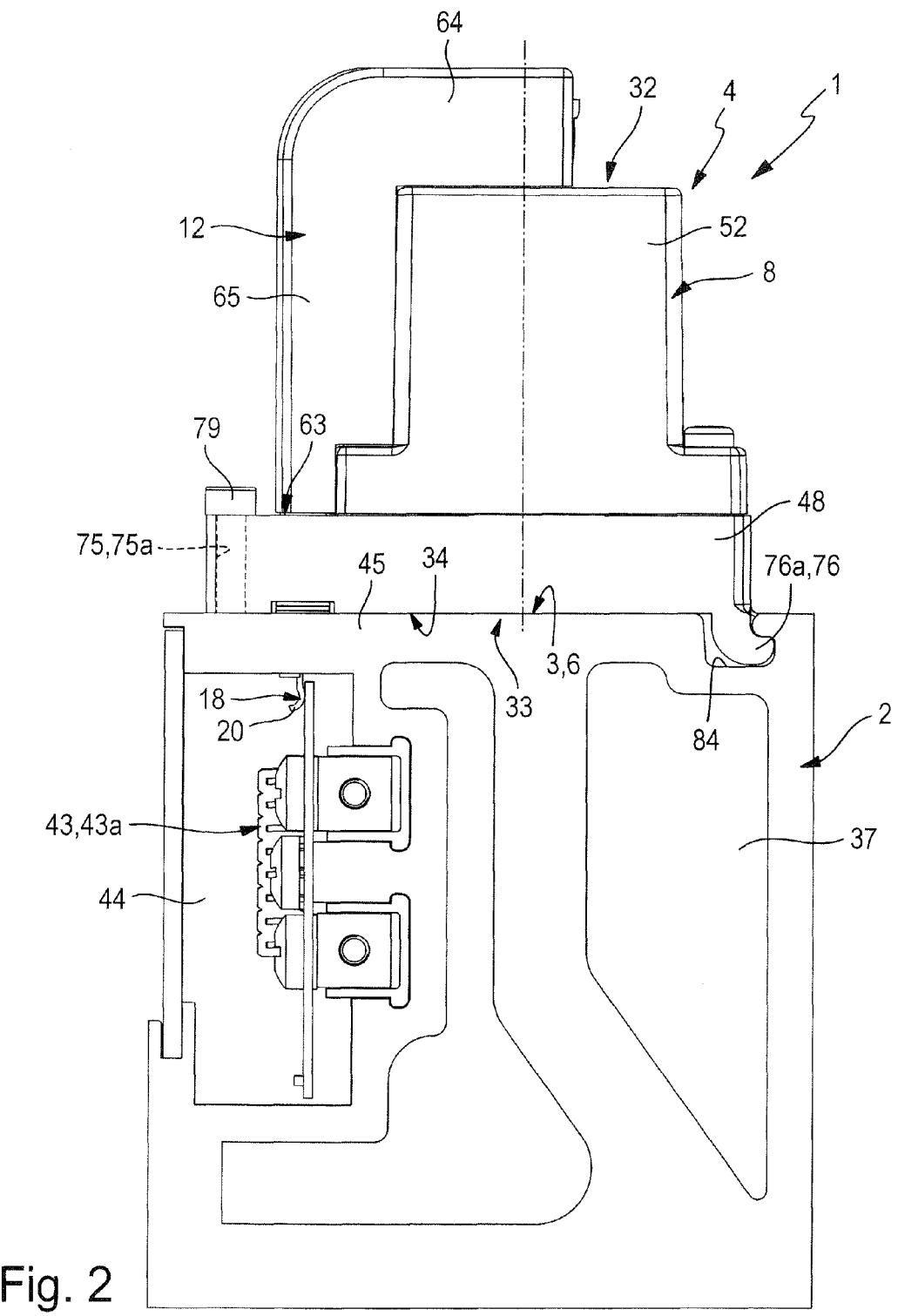
FIG. 2 is a front view of the valve assembly from FIG. 1 in the direction of arrow II from FIG. 1.
Figure 3:
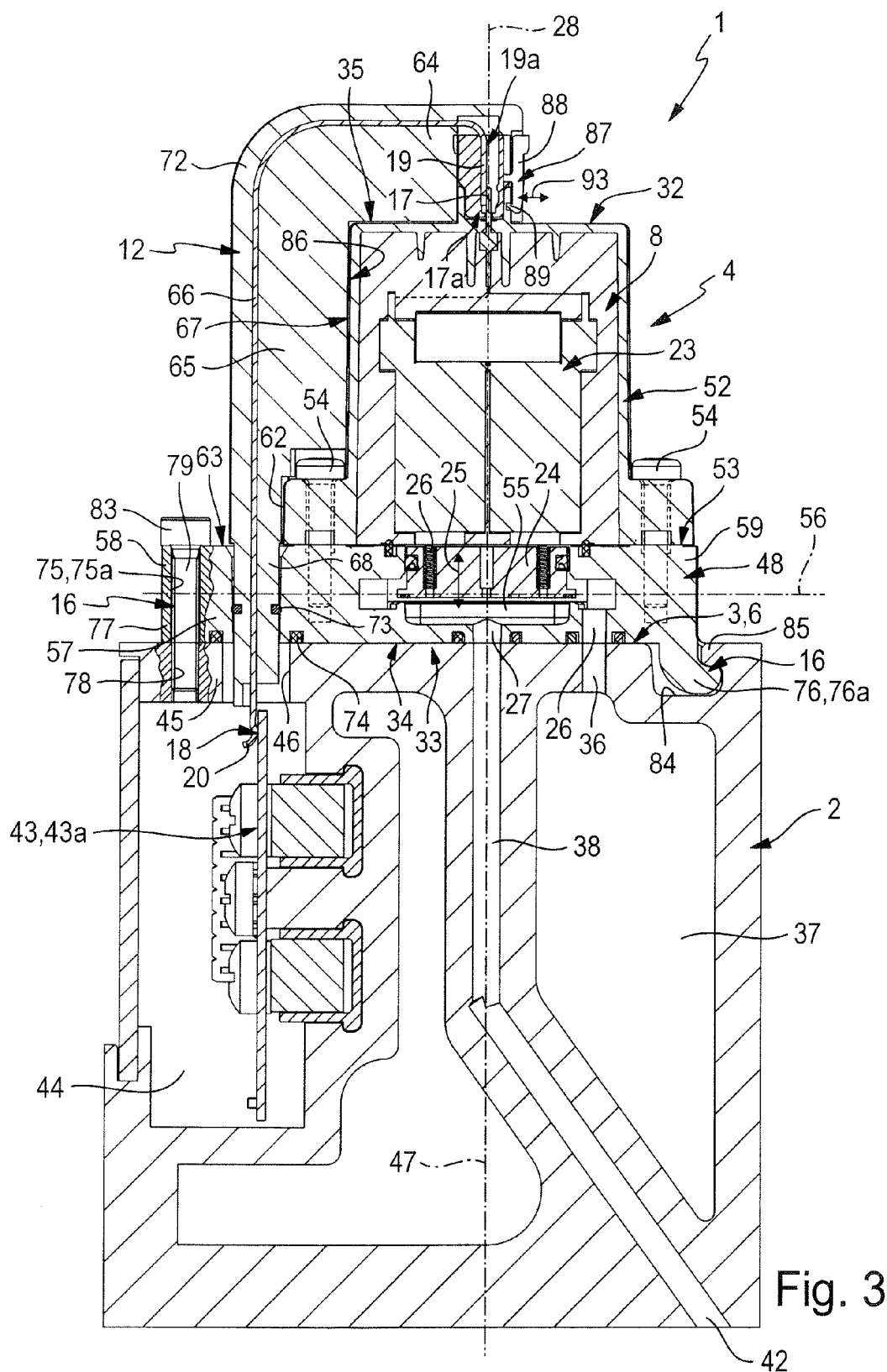
FIG. 3 is a cross-section through the valve assembly from FIG. 1 along line III-III from FIG. 1 in the region of one of the valve units mounted on the valve support in its position of use.

The drawing shows a valve assembly which is generally identified by the reference number 1 and which comprises a valve support 2 and a plurality of releasably mounted valve units 4 adopting a position of use on a mounting surface 3 of the valve support 2. With the exception of one valve unit 4, FIG. 1 shows all valve units 4 in the mounted state in their position of use. One of the valve units 4 is shown removed from the valve support 2 in the figure.

In deviation from this embodiment, the valve assembly 1 may comprise a single valve unit 4 instead of a plurality of valve units 4. In this case, the size of the mounting surface 3 will be adapted accordingly. The same applies to the valve support 2.

The valve support 2 of the illustrated embodiment has a longitudinal axis 5, the mounting surface 3 extending in the direction of this longitudinal axis 5. The mounting surface 3 is a flat surface in particular.

At least in the longitudinal section where the mounting surface 3 is situated, the valve support 2 is preferably designed as a single-piece body. The mounting surface 3 is divided into a plurality of mounting locations 6, which are arranged consecutively in a line-up direction 7 indicated by a dot-dash line, the line-up direction 7 preferably coinciding with the longitudinal direction of the valve support 2 defined by the longitudinal axis 5. The mounting locations 6 are formed from sections of the mounting surface 3 arranged side by side in the line-up direction 7.

In an embodiment not shown in the drawing, the valve support 2 has a modular structure in the longitudinal section defining the mounting surface 3 and is divided into individual valve support modules which are arranged in a row in the longitudinal direction and each of which defines one or more of the mounting locations 6.

When ready for use, the valve support 2 expediently comprises a connecting body on each of its two end faces. These connecting bodies are in particular used to close internal cavities of the valve support 2 on its end faces. These connecting bodies are not shown in the drawing for better clarity.

Each valve unit 4 comprises an electrically actuated valve 8 and a connecting bridge 12, which is preferably releasably attached to the valve 8 and the function of which will be explained later. This being so, the valve unit 4 can be described as an assembly composed of a valve 8 and a connecting bridge 12. In order to obtain a valve unit 4, the connecting bridge 12 can be fitted to the valve 8 in an assembly movement 13 indicated by an arrow in FIG. 1. In this assembled state, the entire valve unit 4 can then be attached with its underside 33 leading to the mounting surface 3 in a fitting movement 14 indicated by an arrow. This position of use of the valve unit 4 can be releasably fixed by means of a fastening device generally identified by the reference number 16.

Alternatively, for attaching a valve unit 4 to the valve support 2, it is possible to mount initially only the valve 8 without the connecting bridge 12 on the valve support 2 and only then to attach the connecting bridge 12 to the pre-assembled valve 8 within the assembly movement 13.

Each valve 8 is of the type suitable for electric actuation. Connecting means 17 accessible on an outside of the valve 8 are designed to receive electric actuating signals and to actuate on this basis drive means 23 located in the interior of the valve 8. The drive means 23 in turn are capable of driving in response to their electric actuation an associated valve member 24 likewise located in the interior of the valve 8, in order to initiate a switch-over movement of the valve member 24 for positioning the valve member 24 in different switching positions.

The electrically actuated drive means 23 of the illustrated embodiments are preferably designed to be electromagnetic, so that the valve 8 can be described as a solenoid valve. If suitably activated electrically, the drive means 23 can generate a magnetic field by which the valve member 24 is attracted, with the result that it is switched from a previously adopted first switching position into a second switching position. If the drive means 23 are then deactivated, the magnetic field is no longer available, and the valve member 24 returns to the first switching position, in particular under the influence of spring means 26.

In the interior of the valve 8, a valve feed passage 26 is formed, through which the valve 8 is supplied with a pressure fluid to be controlled, in particular compressed air. Depending on its switching position, the valve member 24 is capable of fluidically connecting at least one valve operating passage 27 optionally to the valve feed passage 26 or to disconnect it from the valve feed passage 26. In this way, a pressure fluid to be used as required can be made available to the valve operating passage 27.

In the illustrated embodiment, the valves 8 are configured as 2/2-way valves. Generally, however, each valve 8 can be given its own valve functionality and can, for example, be designed as a 3/2-way valve or even as a 5/2-way valve.

The valve 8 has a vertical or height axis 28. The vertical axis 28 also represents the vertical or height axis of the assembled valve unit 4. The valve 8 further has a top side 32 oriented in the direction of the vertical axis 28 and an oppositely oriented underside 33, these sides or directions applying to the valve unit 4 as well.

The first electric connecting means 17 are preferably located on the top side 32 of the valve 8. On the underside 33, the valve 8 has a base surface 34, which is in contact with the associated mounting location 6 of the mounting surface 3 in the position of use.

On the top side 32, the valve 8 has an upper outer surface 28, which is oriented in the direction of the vertical axis 28 and relative to which the first electric connecting means 17 expediently protrude upwards.

The valve feed passage 26 terminates at the base surface 34 and lies opposite the opening of a branch passage 36, which is formed in the valve support 2 and communicates with a header feed passage 37 formed in the valve support 2. This extends through the valve support 2 in its longitudinal direction and terminates with a plurality of branch passages 36 at each of the mounting locations 6 for communication with the valve feed passage 26 of the valve 8 located there. In the operation of the valve assembly 1, the header feed passage 37 is, via a feed port of the valve support 2 not shown in the drawing, connected to an external pressure source which supplies the pressure fluid to be controlled by the valves 8, which is fed to all valves 8 via the branch passages 36.

The valve operating passage 27 expediently likewise terminates at the base surface 34 of the valve 8, its opening lying opposite the opening of an individual valve support operating passage 38 passing through the valve support 2, which opening is located on the mounting surface 3. With an operating outlet 42, the operating passage 38 terminates towards an outer surface of the valve support 2, so that there is, for example, the opportunity for connecting a fluid line leading to a load to be operated. Alternatively, the operating outlet 42 can be used to feed a nozzle by means of which sorting operations can be carried out on the basis of pneumatic pulses. Furthermore, the operating outlet 42 itself can form such a nozzle.

In an embodiment not illustrated, the valve operating passage 27 terminates away from the base surface 34 at an outer surface of the valve 8, where connecting means are provided for the connection of a fluid line leading to a load.

The first electric connecting means 17 receive the electric actuating signals required for the operation of the associated valve 8 from electric signal transmission means 43 located in or on the valve support 2. In the illustrated embodiment, these electric signal transmission means 43 are located in a signal transmission chamber 44, which is formed in the interior of the valve support 2 and is expediently designed in the manner of a channel, extending in the valve support 2, particular in its longitudinal direction. The signal transmission means 43 may in particular be a parallel or serial electric bus. In the operation of the valve assembly 1, the signal transmission means 43 are on the input side connected to an electronic control unit not shown in detail, which can be arranged externally or configured as a part of the valve assembly 1. As is the case in the illustrated embodiment, the signal transmission means 43 are preferably implemented by means of a printed circuit board arrangement 43a, but in principle they can also be provided in the form of individual flexible wire conductors.

The electric signal transmission means 43 are for each valve 8 provided with second electric connecting means 18 to facilitate the pickup of the electric signals destined for the valve 8. In the illustrated embodiment, the second electric connecting means 18 consist of electrically conductive contact surfaces which are represented by conductor tracks in particular.

The second electric connecting means 18 are accessible from outside the valve support 2 and, in more precise terms, from the mounting surface 3 for the purpose of signal pickup. For this purpose, a valve support wall 45 provided with the mounting surface 3 and bounding the signal transmission chamber 44 has a wall opening 46, which terminates on one side towards the mounting surface 3 at the associated mounting location 6 and on the other side into the signal transmission chamber 44. If we identify an axis of the valve support 2 which extends parallel to the vertical axis 28 of the assembled valve unit 4 as valve support vertical axis 47, the wall opening 46 expediently extends in the same direction as this valve support vertical axis 47.

The wall opening 46 is placed such that the second electric connecting means 18 are arranged opposite in the interior of the signal transmission chamber 44.

In the region of its underside 33, the valve 8 has a mounting base 48, by means of which it is releasably attached to the valve support 2 in its position of use. The base surface 34 of the valve 8 is located on the mounting base 48.

In the direction towards the top side 32, the mounting base 48 is adjoined by a drive section 52 of the valve 8, where the drive means 23 are at least partially accommodated. The drive section 52 expediently is a component which is separate from the mounting base 48 and which is attached to a joint surface 53 of the mounting base 48 opposite the base surface 34. The drive section 52 is attached to the mounting base 48 with the aid of fastening means 54, such as mounting screws. In place of mounting screws, other fastening means 44 can be used, for example a bonded or welded joint. In an embodiment not shown in the drawing, the drive section 52 is integrated with the mounting base 48.

The valve member 24 is expediently accommodated movably at least partially and in particular as a whole in a valve chamber 55 formed in the interior of the mounting base 48.

At right angles to the vertical axis 28, the valve 8 expediently has an oblong, in particular rectangular, cross-section. The latter applies to the mounting base 48 as well. In other words, the mounting base 48 has, if viewed from the underside 33 of the valve 8, an oblong and expediently rectangular outline. A resulting longitudinal axis 56 of the mounting base 48 extends perpendicular to the vertical axis 28 and is, in the position of use of the valve unit 8, expediently oriented perpendicular to the longitudinal axis 5 of the valve support 2 as well.

On at least one point of the outline of the drive section 52, the mounting base 48 protrudes beyond the drive section 52 at right angles to the vertical axis 28. This section of the mounting base 48, which protrudes beyond the drive section 52, will be identified as base projection 57.

As a result of its oblong shape, the mounting base 48 of the illustrated embodiment has two narrow end sections arranged opposite each other; for easier differentiation, these will be described as first end section 58 and second end section 59. In the direction of the longitudinal axis 56, these two end sections 58, 59 are oriented oppositely relative to one another. The base projection 57 of the illustrated embodiment is represented by the first end section 58.

Apart from the base projection 57, the lateral outer surfaces of the mounting base 48, which are oriented perpendicular to the vertical axis 28, are preferably flush with the adjoining outer surfaces of the drive section 52.

In the base projection 57, a through-hole 62 is formed, which extends in the vertical direction of the valve 8 and terminates on one side towards the base surface 34 and on the other side towards the upward-facing top outer surface 63 of the base projection 57 opposite the base surface 34. The through-hole 62 is placed such that it is in alignment with the wall opening 46 of the valve support 2.

The connecting bridge 12 mentioned above is used to establish the electric connection between the first electric connecting means 17 of the valve 8 and the second electric connecting means 18 of the signal transmission means 43.

The first electric connecting means 17 are located on the top side of the valve 8 and preferably face upwards. If the connecting bridge 12 is not fitted, the first electric connecting means 17 are therefore accessible very easily if a valve 8 has to be contacted individually by means of flexible conductors, in particular cables, leading to the valve 8 independently of the valve support 2.

The connecting bridge 12 is L-shaped and has a first L-leg 64 and a second L-leg 65, which is at least substantially oriented at right angles thereto. The first L-leg 64 comprises first electric mating connecting means 19, in particular in the region of its free end, while the second L-leg 65 comprises second electric mating connecting means 20, likewise in the region of its free end. The first electric mating connecting means 19 and the second electric mating connecting means 20 are connected to one another in an electrically conductive manner and in the correct assignment by means of electric connecting conductors 66 of the connecting bridge 12, which run in the interior of the connecting bridge 12 in particular.

The connecting bridge 12, by way of example, has a housing 72, which predetermines the L-shape and in the interior of which the connecting conductors 66, which may, for example, be represented by cables, contact plates and/or at least one printed circuit board, are located.

When the connecting bridge 12 is mounted on the valve 8, the first electric connecting means 17 of the valve 8 are electrically connected to the first electric mating connecting means 19 of the first L-leg 64. Both the first electric connecting means 17 and the first electric mating connecting means 19 are oriented in the vertical direction in particular, so that they come into contact with one another when the connecting bridge 12 is fitted to the valve 8 from above in an assembly movement 13 parallel to the direction of the vertical axis 28.

If assembled in this way, the top side 32 of the valve 8 is partially or totally overlapped by the first L-leg, while the second L-leg 65 extends adjacent to the valve 8 downwards towards the underside 33 while laterally projecting downwards adjacent to the drive section 52.

The connecting bridge 12 is arranged on the valve 8 in such a way that its second L-leg 65 extends downwards adjacent to that lateral outer surface 67 of the drive section 52, relative to which the base projection 57 protrudes. In this process, the connecting bridge 12 engages with its second L-leg 65 the through-hole 62 formed in the base projection 57. The section of the second L-leg 65 which extends through the through-hole 62 is preferably designed as a support section 68, which is peripherally supported on the inner circumferential surface of the through-hole 62. In this way, the connecting bridge 12 is as a whole stabilised in its transverse direction.

The second L-leg 65 is releasably inserted into the base projection 57 from the top outer surface 63. As a result, the connecting bridge 12 can be removed, i.e. pulled out, at any time if required.

The second L-leg 65 is inserted into the through-hole 62 within the assembly movement 13, and this process is at least temporarily superimposed to the establishment of a connection between the first electric connecting means 17 and the first electric mating connecting means 19. This connection is preferably a plug-in connection, which in the illustrated embodiment results from the fact that the first electric connecting means 17 belong to a plug-in connection device 17a provided on the top side 32 of the valve 8 and the first electric mating connecting means 19 are a part of a mating plug-in connection device 19a provided on the first L-leg. If the connecting bridge 12 is fitted to the valve 8 from above within the assembly movement 13, a first plug-in connection is formed between the mating plug-in connection device 19a and the plug-in connection device 17a; this process is accompanied by the establishment of an electric contact between the first electric mating connecting means 19 and the first electric connecting means 17.

The through-hole 62 of the base projection 57 is expediently entirely closed peripherally, resulting in an optimum transverse support of the engaged second L-leg 65.

The second L-leg 65 projects downwards beyond the base surface 34 of the mounting base 48 and contacts, with the second electric mating connecting means 20 assigned to its free end region, the second electric connecting means 18 of the signal transmission means 43. In this way, the desired releasable electric connection between the signal transmission means 43 and the first electric connecting means 17 of the valve 8 is established.

The second L-leg 65 expediently dips into the wall opening 46 with its end section protruding at the bottom from the mounting base 48. The housing 72 of the connecting bridge 12, which accommodates the connecting conductors 66, can terminate within the wall opening 46. At least the second electric mating connecting means 20, however, expediently extend into the signal transmission chamber 44 for coming into electric contact with the second electric connecting means 18.

The electric connection between the second electric mating connecting means 20 and the second electric connecting means 18 expediently is a purely non-positive connection. In this context, the second electric mating connecting means 20 are preferably designed as spring contacts which bear against the contact surfaces of the second electric connecting means 18 under preload. The electric connection is established automatically when the valve unit 4 is attached to the mounting surface 3 or when, following the mounting of the valve 8, the connecting bridge 12 is fitted to the valve 8 already placed on the mounting surface 3.

To prevent the ingress of moisture into the signal transmission chamber 44 through the through-hole 62, it is advantageous if the second L-leg 65 is provided with an annular seal 73 in sealing contact with the inner circumferential surface of the through-hole 62 at the outer circumference of its support section 68.

To prevent the ingress of moisture between the mounting base 48 and the valve support 2 in the joint region as well, it is advantageous if the mounting base 48 is provided at its base surface 34 with an annular seal 74, which frames the through-hole 62 as well as the end of the wall opening 46 at the mounting surface 3 and tightly bears against the mounting surface 3.

The fastening device 16 mentioned above expediently comprises at least one first fastening means 75 formed on the base projection 57 and preferably also at least one second fastening means 76 formed at the opposite second end section 59.

The first fastening means 75 is located on an external mounting end section 77 of the base projection 57, which adjoins the through-hole 62 on the outside remote from the drive section 52. In other words, the through-hole 62 is located between the region of the mounting base 48 which supports the drive section 52 and the freely ending mounting end section 77 with the at least one first fastening means 75.

In the illustrated embodiment, the at least one and preferably precisely one first fastening means 75 is a mounting hole 75a, which extends through the mounting end section 77 in the vertical direction of the valve 8, so that its lower end terminates at the base surface 34 and its upper end terminates at the top outer surface 63. The mounting hole 75a is in alignment with a threaded hole 78, which is formed in the wall 45 of the valve support 2 and which forms a part of the fastening device 16 in the same way as a mounting screw 79, which is inserted into the mounting hole 75a from the top outer surface 63 and tightened into the adjoining threaded hole 78. With a screw head 83, it is supported on the top outer surface 63 of the base projection 57, thereby clamping the latter to the valve support 2 or the mounting surface 3 in the vertical direction of the valve 8.

The second fastening means 76 assigned to the opposite second end section 59 and the further associated components of the fastening device 16 can be designed to be comparable to those described above. The design implemented in the illustrated embodiment, however, is particularly advantageous. In this, the second fastening means 76 is designed as a mounting hook 76a, which engages with an anchoring groove 84, which is open towards the mounting surface 3 and has an undercut groove cross-section. The mounting hook 76a engages from below with an anchoring projection 85 of the valve support 2, which bounds a groove neck of the anchoring groove 84 and is preferably rib-shaped, resulting in a positive connection between the mounting hook 76a and the anchoring projection 85 in the vertical direction of the valve 8. As a result, the mounting base 48 can no longer be lifted off the valve support 2 at the second end section 59.

For mounting on the valve support 2, the valve unit 4 can, in an inclined orientation, be brought to the mounting surface 3 in such a way that the mounting hook 76a first dips into the anchoring groove 84, whereupon the whole valve unit 4 is pivoted downwards about the region of the mounting hook 76a, until the whole base surface 34 of the mounting base 48 lies on the mounting surface 3. Now only the mounting screw 79 has to be fitted.

In the region of the lateral outer surface 67 facing the connecting bridge 12, the drive section 52 expediently has an outer contour which is stepped in the vertical direction 28. In the region adjoining the mounting base 48, the drive section 52 has larger dimensions in the direction of the longitudinal axis 56 than in the adjoining section extending to the top outer surface 35. If we now consider that the base projection 57 protrudes beyond the drive section 52 in the same direction, the outside of the valve 8 facing the connecting bridge 12 has a stair-like contour. This stair-like contour is based on the fact that the second L-leg 65 is likewise stepped in its longitudinal direction on its inner long side 86 facing the valve 8. As a result, the connecting bridge 12 can directly bear against the lateral outer surface 67 of the drive section 52. In the longitudinal direction of the mounting base 48, the through-hole 62 expediently directly adjoins the drive section 52 on the mounting base 48.

As mentioned above, the connecting bridge 12 is preferably releasably attached to the valve 8. It is advantageous if the valve 8 has a latch connection device 87 for this purpose. This is the case in the illustrated embodiment.

The latch connection device 87 expediently acts between the first L-leg 64 of the connecting bridge 12 and the end section of the valve 8 assigned to the top side 32. The latch connection device 87 is preferably assigned to the first mating plug-in connection device 19a on the side of the second L-leg 65 and to the first plug-in connection device 17a on the side of the valve 8.

The latch connection device 87 preferably comprises at least one first latch connection means 88 located on the connecting bridge 12 and at least one second latch connection means 89 provided to act together with the former and located on the valve 8 and on the drive section 52 in particular. The first latch connection means 88 is expediently provided on the second L-leg 65 of the connecting bridge 12, while the second latch connection means 89 is preferably located on the top side 32 of the valve 8, being expediently located on the first plug-in connection device 17a. The first latch connection means 88 is preferably designed as a snap hook pivotably mounted on the second L-leg 65, while the second latch connection means 89 is in particular designed as a latching recess, which may be slot-like, for example.

If the connecting bridge 12 is placed on the valve 8, the snap hook representing the first latch connection means 88 engages with the latching recess 89 representing the second latch connection means 89 and establishes a positive lock against the fitting direction. To release this lock against the fitting direction, the snap hook can be operated with the finger of one hand, so that it is pivoted in the direction indicated by the double-headed arrow 93 and is disengaged from the latching recess, allowing the connecting bridge 12 to be pulled off in an upward direction, while the second L-leg 65 is pulled out of the through-hole 62 of the base projection 57.

In an embodiment not shown in the drawing, the latch connection device 87 acts at another point between the connecting bridge 12 and the valve 8.

In another embodiment not shown in the drawing, the first electric connecting means 17 are located in the region of a lateral outer surface of the valve 8, which is oriented perpendicular to the vertical axis 28. This is in particular that lateral outer surface 67 of the drive section 52 which faces the second L-leg 65 of the connecting bridge 12. The first electric mating connecting means 19 are then preferably located on the second L-leg 65 of the connecting bridge 12. In this case, the first L-leg 64 is preferably used for the purely mechanical location of the connecting bridge 12 on the valve 8. In this embodiment, it is in particular provided that a plug-in connection device 17a is provided on the top side 32 of the valve 8; this cooperates with a mating plug-in connection device 19a on the first L-leg 64, but no electric connecting means or electric mating connecting means are assigned to these. In this case, the latch connection device 67 is also provided in the way described above.

In this case, too, the connecting bridge 12 can expediently be fitted to and removed from the valve 8 using a movement oriented in the direction of the vertical axis 28. The first electric connecting means 17 located on the valve 8 are by way of example designed as spring contact means which cooperate with first electric mating connecting means 19 provided on the facing side surface of the second L-leg 65, for example in the manner as described above with reference to the second electric connecting means 18 and the second electric mating connecting means 20.

The invention claimed is:

1. A valve assembly comprising a valve support and at least one valve unit fitted in its position of use with its underside leading to a mounting surface of the valve support, wherein the valve unit comprises an electrically actuated valve with externally accessible first electric connecting means, and wherein electric signal transmission means with second electric connecting means accessible from the mounting surface are located in or on the valve support, wherein the valve unit further comprises an L-shaped connecting bridge mounted on the valve for the mutual electric connection of the first and second electric connecting means, the connecting bridge overlapping, with a first L-leg, the top side of the valve opposite its underside and projecting downwards, with a second L-leg extending in a height direction of the valve, laterally past a drive section of the valve containing electrically actuated drive means, wherein first electric mating connecting means located on the connecting bridge are contacted to the first electric connecting means of the valve and wherein second electric mating connecting means, which are located on the second L-leg and which are electrically connected to the first electric mating connecting means via electric connecting conductors of the connecting bridge, are electrically contacted to the second electric connecting means assigned to the valve support in the position of use of the valve unit, wherein the valve comprises in the region of the underside of the valve unit a mounting base, which is used for the mechanical fixation of the valve on the valve support and which has a base projection which laterally projects relative to the drive section located above and which is penetrated by the second L-leg of the connecting bridge.

2. A valve assembly according to claim 1, wherein the first electric connecting means are located on the top side of the valve and the first electric mating connecting means are located on the first L-leg of the connecting bridge.

3. A valve assembly according to claim 1, wherein the L-shaped connecting bridge is releasably mounted on the valve, wherein the second L-leg of the connecting bridge can be removed from the base projection while the connecting bridge is removed from the valve.

4. A valve assembly according to claim 1, wherein a through-hole, which is oriented in the longitudinal direction of the second L-leg and which is entirely enclosed peripherally and through which the second L-leg passes, passes through the base projection.

5. A valve assembly according to claim 4, wherein the second L-leg has, at the outer circumference of the section extending within the through-hole, an annular seal in sealing contact with the inner circumferential surface of the through-hole.

6. A valve assembly according to claim 4, wherein the mounting base has at its base surface facing the mounting surface a seal which frames the through-hole and is in sealing contact with the mounting surface.

7. A valve assembly according to claim 1, wherein, adjoining the region through which the second L-leg passes, the base projection has a freely terminating outer mounting end section, which is provided with at least one fastening means, which contributes to the releasable location of the mounting base to the valve support.

8. A valve assembly according to claim 7, wherein at least one fastening means is designed as a mounting hole which passes through the mounting end section of the base projection in a height or vertical direction of the valve and through which a mounting screw extends to locate the valve on the valve support.

9. A valve assembly according to claim 8, wherein the mounting hole is in alignment with a threaded hole formed in the valve support and open towards the mounting surface, the mounting screw being supported with a screw head on a top outer surface of the base projection and being tightened into the threaded hole.

10. A valve assembly according to claim 1, wherein the mounting base comprises, at an end section which is opposite the base projection and arranged at a distance from the base projection, at least one further fastening means, which likewise contributes to the releasable location of the mounting base to the valve support.

11. A valve assembly according to claim 10, wherein the at least one further fastening means is designed as a mounting hook which engages with an undercut anchoring groove of the valve support and which acts together with the valve support in a positive-locking manner.

12. A valve assembly according to claim 1, wherein the mounting base, as viewed from the underside of the valve, has an oblong outline defined by two narrow-side end sections, the base projection being represented by one of the two narrow-side end sections of the mounting base.

13. A valve assembly according to claim 1, wherein the mounting base, as viewed from the underside of the valve, has a rectangular outline defined by two narrow-side end sections, the base projection being represented by one of the two narrow-side end sections of the mounting base.

14. A valve assembly according to claim 1, wherein the connecting bridge is releasably located positively on the valve by means of a latch connection device.

15. A valve assembly according to claim 14, wherein first latch connection means of the connecting bridge, which are part of the latch connection device, are located on the first L-leg of the connecting bridge.

16. A valve assembly according to claim 15, wherein the first latch connection means of the connecting bridge comprise a pivotably mounted snap hook.

17. A valve assembly according to claim 1, wherein the first electric connecting means belong to a plug-in connection device provided on the top side of the valve and the first electric mating connecting means are a part of a mating plug-in connection device provided on the first L-leg of the connecting bridge and being in releasable engagement with the plug-in connection device.

18. A valve assembly according to claim 1, wherein the drive section of the valve has an outer contour which is stepped in the vertical direction of the valve, so that the valve has a stair-like contour on the side of the base projection, the second L-leg being stepped on its inner longitudinal side facing the valve in accordance with the facing lateral outer surface of the drive section.

19. A valve assembly according to claim 1, wherein the valve support has, below the region of the mounting base through which the second L-leg of the connecting bridge passes, a wall opening, into which the second L-leg of the connecting bridge dips with an end section projecting downwards from the base projection and wherein the end section comprises the second electric mating connecting means.

20. A valve assembly according to claim 19, wherein the valve support comprises an internal signal transmission chamber, into which the wall opening terminates and in which the electric signal transmission means with the second electric connecting means are located.

21. A valve assembly according to claim 1, wherein the drive section is a component separate from the mounting base and mounted thereon.

22. A valve assembly according to claim 21, wherein the mounting base contains at least one valve member movable by the drive means of the drive section.

23. A valve assembly according to claim 1, wherein the mounting surface of the valve support is divided into a plurality of mounting locations, which are arranged in a row in a line-up direction and each of which can be or is detachably fitted with a valve unit, and wherein the valve support further comprises a header feed passage extending in the valve support, wherein the header feed passage communicates with the valves of all valve units on the mounting locations.

\* \* \* \* \*